United States Patent
Chang et al.

(10) Patent No.: US 8,811,658 B2
(45) Date of Patent: Aug. 19, 2014

(54) INTERPOLATION METHOD FOR IMAGE PICTURES AND IMAGE PROCESSING APPARATUS THEREOF

(75) Inventors: Ching-Hua Chang, Taipei Hsien (TW); Chun-Hsing Hsieh, Hsin-Chu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1663 days.

(21) Appl. No.: 12/120,238

(22) Filed: May 14, 2008

(65) Prior Publication Data
US 2008/0285808 A1 Nov. 20, 2008

(30) Foreign Application Priority Data
May 15, 2007 (TW) .............................. 96117199 A

(51) Int. Cl.
*G06K 9/00* (2006.01)
*H04N 7/01* (2006.01)

(52) U.S. Cl.
CPC .............. *H04N 7/012* (2013.01); *H04N 7/0137* (2013.01)
USPC ............................ 382/103; 382/300; 382/106

(58) Field of Classification Search
USPC ................... 382/103, 106, 107, 300; 348/446
See application file for complete search history.

(56) References Cited

U.S. PATENT DOCUMENTS

| | | | | |
|---|---|---|---|---|
| 5,661,525 A | * | 8/1997 | Kovacevic et al. | 348/452 |
| 5,682,205 A | * | 10/1997 | Sezan et al. | 348/452 |
| 6,151,363 A | * | 11/2000 | Burl et al. | 375/240.17 |
| 6,900,676 B1 | | 5/2005 | Tamura | |
| 6,992,725 B2 | * | 1/2006 | Mohsenian | 348/448 |
| 7,362,374 B2 | * | 4/2008 | Holt et al. | 348/446 |
| 7,652,721 B1 | * | 1/2010 | Holt et al. | 348/446 |
| 2004/0174459 A1 | * | 9/2004 | Holt et al. | 348/452 |
| 2006/0181361 A1 | | 8/2006 | Van De Gevel et al. | |

FOREIGN PATENT DOCUMENTS

| | | |
|---|---|---|
| EP | 1 139 659 A2 | 10/2001 |
| TW | 200534699 | 10/2005 |
| TW | 200603622 | 1/2006 |
| TW | 200638776 | 11/2006 |

* cited by examiner

*Primary Examiner* — Wesley Tucker
(74) *Attorney, Agent, or Firm* — McClure, Qualey & Rodack, LLP

(57) ABSTRACT

An interpolation method, applied to image pictures, for interpolating at least one pixel into a position to be interpolated in a target image frame is disclosed. The interpolation method includes receiving a plurality of image fields having a corresponding image object, estimating a motion speed of the image object according to a distance between a first pixel position to which the image object located in a first image field of the plurality of image fields and a second pixel position to which the image object located in a second image field of the plurality of image fields, determining the pixel from the plurality of image fields according to the motion speed of the image object, and interpolating the pixel into the position to be interpolated in the target image frame.

17 Claims, 8 Drawing Sheets

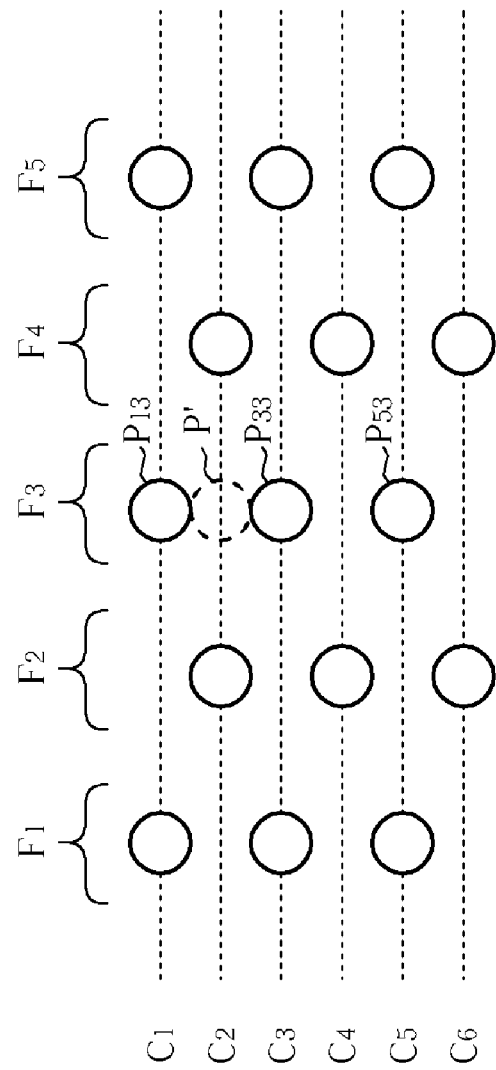

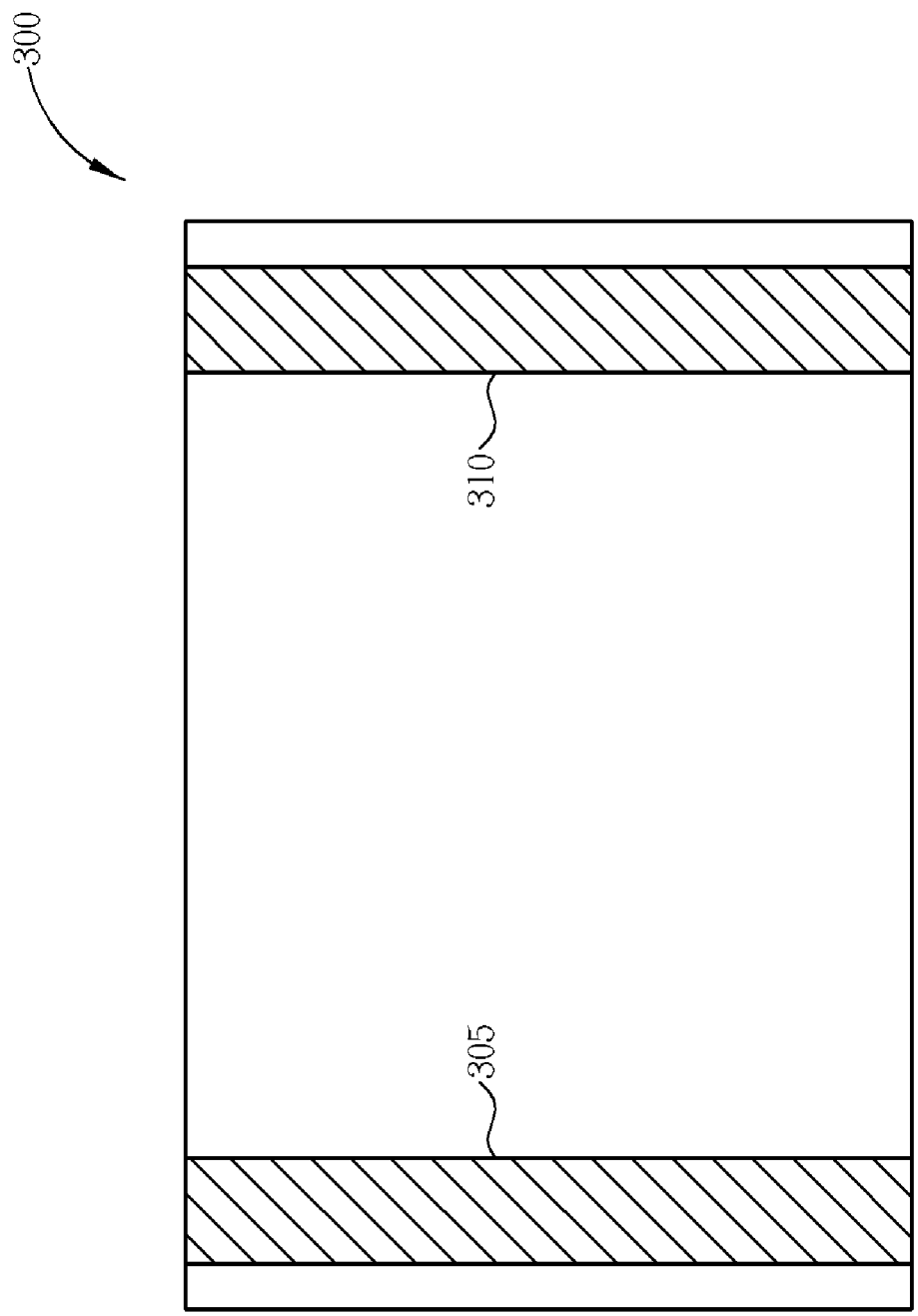

INTERPOLATION METHOD FOR IMAGE PICTURES AND IMAGE PROCESSING APPARATUS THEREOF

BACKGROUND OF THE INVENTION

1. Field of the Invention

The present invention relates to an image processing mechanism, and more particularly, to an interpolation method for image pictures when performing de-interlacing operations and image processing apparatus thereof.

2. Description of the Prior Art

As for the TV system recently, interlaced image formats are usually used for transmitting a TV signal (such as a NTSC TV signal) in order to acquire an improved frame quality by utilizing lower bandwidths. The principle is that a transmitter first scans odd scan lines 1, 3, 5, ..., etc. to from an odd image field and scans even scan lines 2, 4, 6, ..., etc. to from an even image field at a next time point. And then the two image fields are transmitted to a receiver, whereof the odd image field and the even image field are transmitted to the receiver repeatedly and alternately. The receiver (except the traditional CRT display apparatus) can perform a de-interlacing operation to transform the received interlaced image fields into progressive image fields to play the TV signal. The step of performing the de-interlacing operation should be cooperated with a motion compensation operation to interpolate pixels into a position to be interpolated in an image frame. However, when using the conventional motion adaptive mechanism to perform the de-interlacing operation and the motion compensation operation to improve image frame quality, the image objects moving in a high frequency in the original image frame are mostly unable to be interpolated effectively (such as the vertically moving caption in frames, that is to say the horse racing light caption).

In addition, due to the vertically moving caption usually having quite a lot of non-smooth edges (i.e., the letter line section of the horse racing light), a clear image frame can't be generated for the users if the conventional motion adaptive mechanism is directly used for performing the de-interlacing operation and the motion compensation operation. One of the conventional motion adaptive mechanism directly uses the information decoded by Moving Picture Experts Group standard or the information of Discrete Cosine Transform to perform the motion compensation operation, whereof its technology content is referred to the related description in the TWN patent No. 200514443. As for the image data that are not decoded by Moving Picture Experts Group standard, the decoded information is unable to be obtained by using the abovementioned method. Thus the motion compensation operation cannot be performed accurately.

SUMMARY OF THE INVENTION

It is therefore one of the objectives of the present invention to provide an interpolation method for image pictures and related image processing apparatus for detecting an image object with high frequency motion in the image pictures and for interpolating at least one pixel into a position to be interpolated in a target image frame to solve the abovementioned problem.

According to one embodiment of the present invention, an interpolation method for interpolating at least one pixel into a position to be interpolated in a target image frame of image frames is disclosed. The interpolation method includes receiving a plurality of image fields having a corresponding image object, estimating a motion speed of the image object according to a distance between a first pixel position to which the image object located in a first image field of the plurality of image fields and a second pixel position to which the image object located in a second image field of the plurality of image fields, determining the pixel from the plurality of image fields according to the motion speed of the image object, and interpolating the pixel into the position to be interpolated in the target image frame.

According to another embodiment of the present invention, an image processing apparatus for interpolating at least one pixel into a position to be interpolated in a target image frame is disclosed. The image processing apparatus includes a motion estimation module, a determination module, and a motion compensation module. The motion estimation module is used for estimating a motion speed of an image object according to a first pixel position to which the image object located in a first image field of a plurality of image fields corresponds and a second pixel position to which the image object located in a second image field of the plurality of image fields corresponds and for outputting a corresponding parameter according to the motion speed. The determination module is coupled to the motion estimation module for determining the pixel from the plurality of image fields according to the parameter. The motion compensation module is coupled to the determination module for interpolating the pixel determined by the determination module into the position to be interpolated in the target image frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2(a) is a simplified diagram showing different pixel positions to which vertically moving captions in a plurality of image fields transmitted by a TV signal transmitter corresponds.

FIG. 3 is a simplified diagram of a predetermined range of the vertically moving captions in the TV frame.

DETAILED DESCRIPTION

As for the motion speed of the vertically moving caption in the same channel, it should have the same motion characteristic in practice (for example, no matter the horse racing light caption in TV news moves from up to down or from down to up, its motion speed should be averagely the same in practice). Hence, the spirit of the present invention is to estimate the motion speed of at least one image object in the vertically moving caption to determine one pixel and to interpolate the pixel to a position to be interpolated in a target image frame. The step of estimating the motion speed of the image object in the vertically moving caption is implemented by utilizing a motion detector to compare the distance of different pixel positions of the image object to which a plurality of image fields correspond. The detail operation is described in the following. Furthermore, although only the processing manner for the vertically moving caption in TV frames is described in the whole specification, however, through the teaching of the present invention, it can also be applied to deal with other image objects moving in a high frequency in the TV frames (such as the horizontally moving caption).

Figure 1:
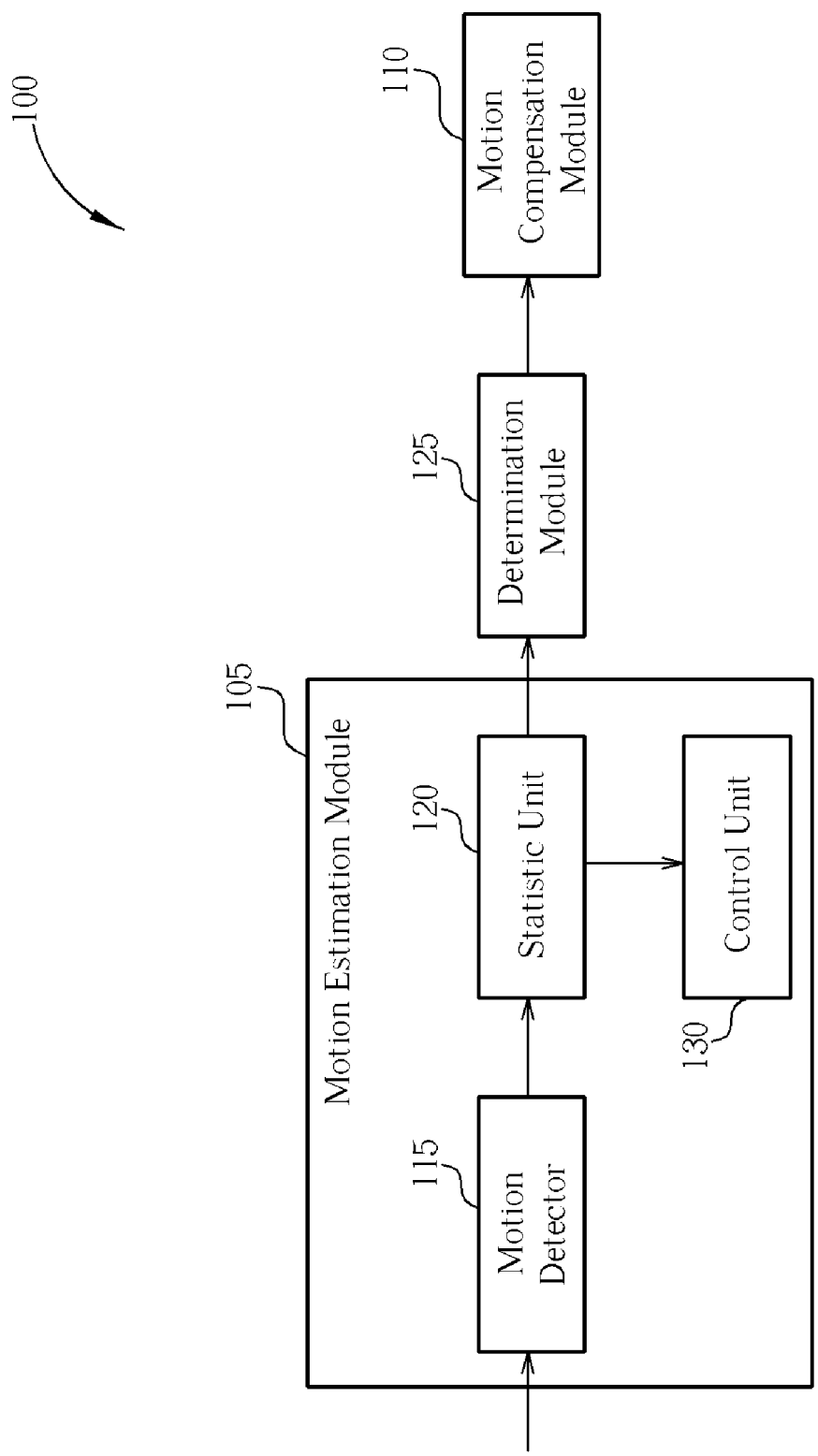
FIG. 1 is a simplified diagram of an image processing apparatus according to an embodiment of the present invention.

Please refer to FIG. 1. FIG. 1 is a simplified diagram of an image processing apparatus 100 according to an embodiment of the present invention. As shown in FIG. 1, the image processing apparatus 100 includes a motion estimation module 105, a determination module 125, and a motion compensation module 110, whereof the motion estimation module 105 includes a motion detector 115, a statistic unit 120, and a control unit 130. The motion estimation module 105 estimates a motion speed of an image object according to a first pixel position to which the image object located in a first image field of a plurality of image fields corresponds and a second pixel position to which the image object located in a second image field of the plurality of image fields corresponds and outputs a corresponding parameter according to the motion speed. The determination module 125 determines a pixel from the plurality of image fields according to the parameter, and the motion compensation module 110 interpolates the pixel determined by the determination module 125 into the position to be interpolated in the target image frame. In this embodiment, the motion estimation module 105 estimates the motion speed of the image object in a vertical direction of the plurality of image fields according to a distance between the abovementioned two pixel positions.

Please refer to FIG. 2(a). FIG. 2(a) is a simplified diagram showing different pixel positions to which vertically moving captions in a plurality of image fields transmitted by a TV signal transmitter corresponds. The circle parts shown in FIG. 2 represent the pixel positions for displaying the letter content to which the vertically moving captions correspond, and image fields $F_1$, $F_3$, and $F_5$ and image fields $F_2$ and $F_4$ respectively represent the image fields that include a plurality of caption pixels (the caption pixels are usually stored into line buffers) to which the pixel positions of odd scan lines $C_1$, $C_3$, and $C_5$ and the pixel positions of even scan lines $C_2$, $C_4$, and $C_6$ correspond. For example, the image field $F_3$ at least include the caption pixels to which the pixel positions $P_{13}$, $P_{33}$, and $P_{53}$ of the scan lines $C_1$, $C_3$, and $C_5$ correspond. Furthermore, assume that the image processing apparatus 100 receives the abovementioned image fields according to a sequence from $F_1$ to $F_5$ (that is receiving the image field $F_1$ first). No matter the vertically moving caption in the frame moves from up to down or from down to up (in this embodiment, assume that the vertically moving caption moves from down to up), the motion detector 115 can be utilized to detect the motion speed of a plurality of image objects in the vertically moving caption to make the determination module 125 determine the pixel that is interpolated into the position to be interpolated in the target image frame (such as the position to be interpolated P' in the image field $F_3$). Detail description is illustrated in the following paragraphs.

Please refer to FIG. 2(b)-FIG. 2(e), which are respectively an operational diagram showing that the motion detector 115 estimates different motion speeds of a plurality of image objects according to the image fields $F_1$-$F_5$. The motion detector 115 detects the plurality of image objects (the caption pixels) to which the pixel positions of different image fields $F_1$-$F_5$ correspond for estimating the motion speeds of the plurality of image objects to generate a plurality of flag values. Hence, as for each image object, the motion detector 115 will refer to two pixel positions located on different scan lines in different image fields $F_1$-$F_5$ to determine whether the two pixel positions are corresponding to the same image object to estimate a motion distance of the image object and to indirectly estimate the motion speed of the image object.

Figure 2B:
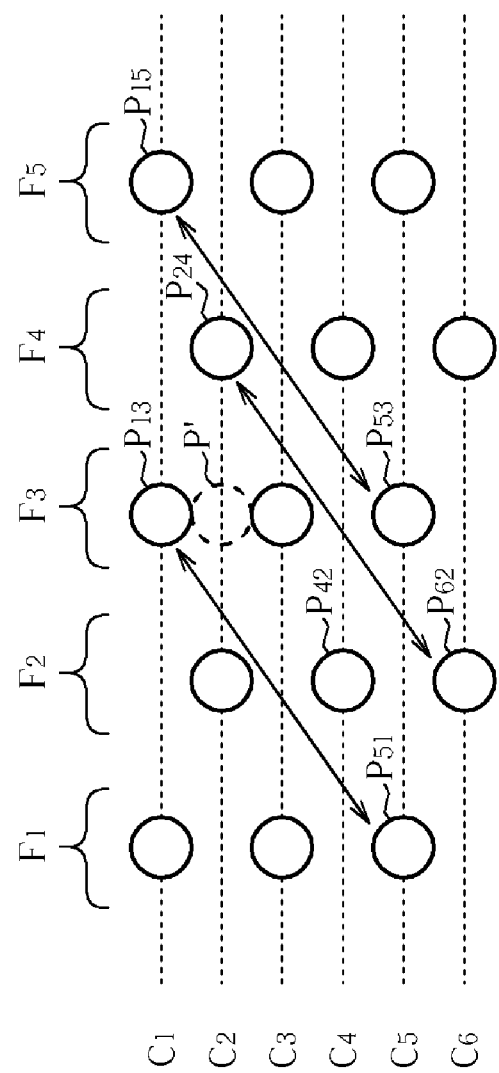
FIG. 2(b) is an operational diagram showing that the motion detector in FIG. 1 estimates a first possible motion speed of the plurality of image objects according to the plurality of image fields.

As shown in FIG. 2(b), the motion detector 115 first detects whether a distance between two pixel positions to which the plurality of image objects in the vertically moving caption correspond is four times of the separated distance between the scan lines within a double playing time of the image field (that is, whether a caption pixel moves for a distance as big as twice of the separated distance between the scan lines within an average playing time of a signal image field). For example, the motion detector 115 respectively calculates the pixel differences between the pixel values to which the pixel positions $P_{13}$ and $P_{51}$, the pixel positions $P_{24}$ and $P_{62}$, and the pixel positions $P_{15}$ and $P_{53}$ correspond and respectively compares the three pixel differences with a predetermined threshold value.

If all of the three pixel differences are smaller than the predetermined threshold value, which represents that the caption pixels to which the three pixel positions correspond are the same pixel and have the same motion speed. At this time, if the caption pixel to which the pixel position $P_{42}$ corresponds is interpolated into the position to be interpolated P', it is more accurate to perform the motion compensation operation. Hence, the motion detector 115 will generate a flag value $f_1$ corresponding to the calculated motion speed.

Figure 2C:
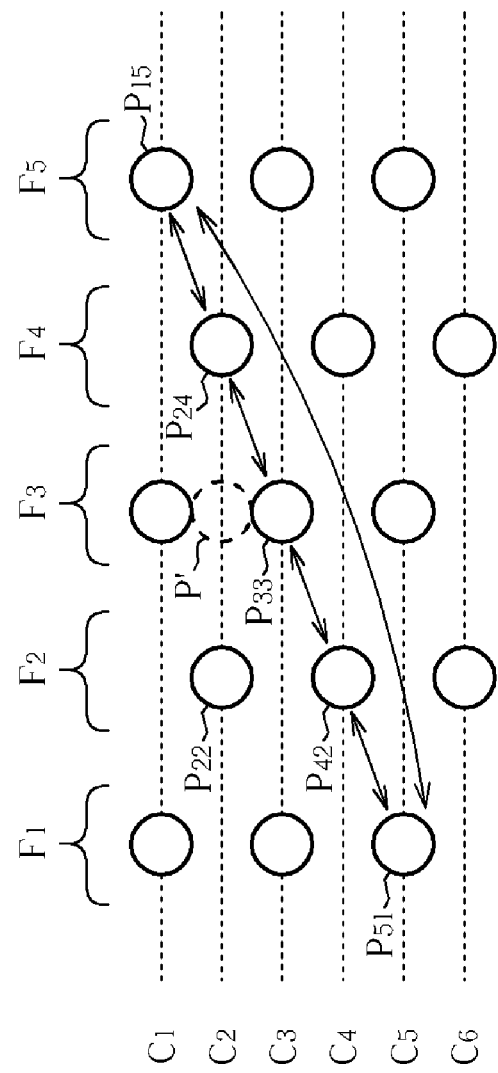
FIG. 2(c) is an operational diagram showing that the motion detector in FIG. 1 estimates a second possible motion speed of the plurality of image objects according to the plurality of image fields.

However, if not all the abovementioned three pixel differences are smaller than the predetermined threshold value, which represents that the distance between two pixel positions to which the plurality of image objects in the vertically moving caption correspond may not be four times of the separated distance between the scan lines within a double playing time of the image field. Thus, the motion detector 115 detects whether the distance between two pixel positions to which the plurality of image objects in the vertically moving caption correspond is a single separated distance between the scan lines within a playing time of a signal image field. The objective is to detect whether a caption pixel moves for a distance the same as the separated distance between the scan lines within an average playing time of a signal image field. For example, as shown in FIG. 2(c), the motion detector 115 respectively calculates the pixel differences between the pixel positions $P_{51}$ and $P_{42}$, the pixel positions $P_{42}$ and $P_{33}$, the pixel positions $P_{33}$ and $P_{24}$, the pixel positions $P_{24}$ and $P_{15}$, and the pixel positions $P_{51}$ and $P_{15}$ and respectively compares the five pixel differences with the predetermined threshold value.

If all of the three pixel differences are smaller than the predetermined threshold value, which represents that the caption pixels to which the three pixel positions correspond are the same pixel and have the same motion speed. At this time, if the caption pixel to which the pixel position $P_{42}$ corresponds is interpolated into the position to be interpolated P', it is more accurate to perform the motion compensation operation. Hence, the motion detector 115 will generate a flag value $f_1$ corresponding to the calculated motion speed.

Figure 2D:
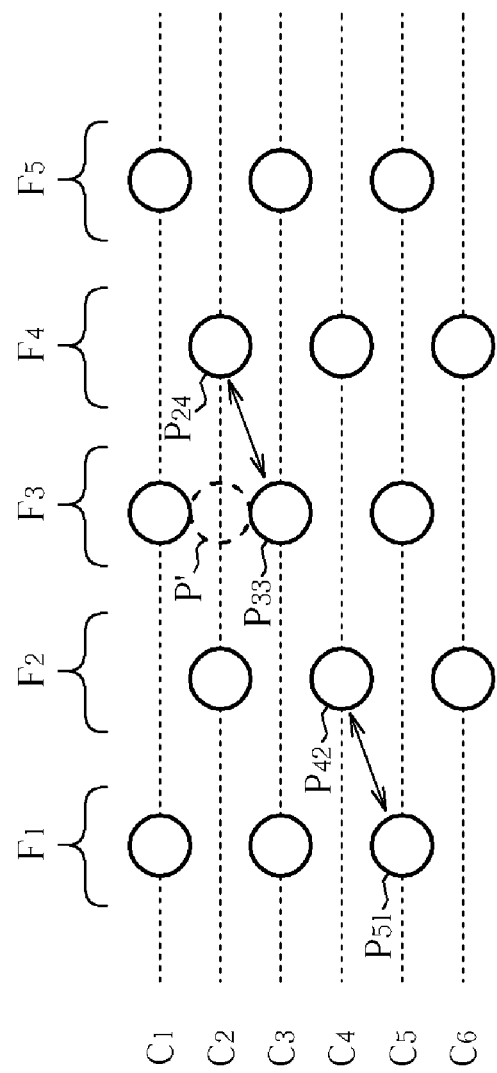
FIG. 2(d) is an operational diagram showing that the motion detector in FIG. 1 estimates a third possible motion speed of the plurality of image objects according to the plurality of image fields.

In addition, if not all the abovementioned five pixel differences are smaller than the predetermined threshold value, which represents that a moving distance of the plurality of abovementioned image objects in the vertically moving caption may not be the same as the separated distance between the scan lines within a playing time of a single image field. Thus, the motion detector 115 detects whether the distance between two pixel positions to which the plurality of image objects in the vertically moving caption correspond is triple of the separated distance between the scan lines within a double playing time of the image field. The objective is to detect whether a caption pixel moves for a distance triples the separated distance between the scan lines within a double playing time of the image field. This is, whether the vertically moving caption averagely moves for a distance one and half of the separated distance between the scan lines within a playing time of a single image field. For example, as shown in FIG. 2(d), the motion detector 115 respectively calculates the pixel differences between the pixel positions $P_{42}$ and $P_{51}$ and pixel positions $P_{33}$ and $P_{24}$ and respectively compares the two pixel differences with the predetermined threshold value. If both of the two pixel differences are smaller than the threshold value, which represents that the caption pixels to which the two pixel positions correspond are the same pixel and have the same motion speed. At this time, if the caption pixel to which the pixel position $P_{42}$ or the pixel position $P_{51}$ corresponds is interpolated into the position to be interpolated P', it is more accurate to perform the motion compensation operation (this is because the caption pixel corresponding to the pixel position $P_{51}$ moves from the pixel position $P_{51}$ to the pixel position $P_{42}$ during the playing time of the image field $F_2$, and moves from the pixel position $P_{42}$ to the position to be interpolated P' during the playing time of the image field $F_3$). Hence, the motion detector 115 will generate a flag value $f_3$ corresponding to the current calculated motion speed.

Figure 2E:
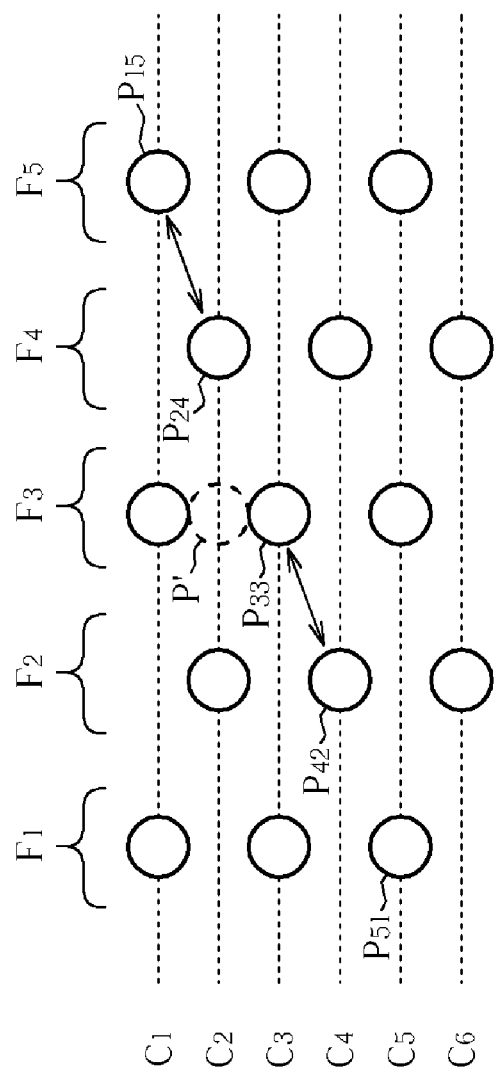
FIG. 2(e) is an operational diagram showing that the motion detector in FIG. 1 estimates a fourth possible motion speed of the plurality of image objects according to the plurality of image fields.

However, if not both the abovementioned two pixel differences are smaller than the predetermined threshold value, the motion detector 115 detects whether the pixel positions $P_{42}$ and $P_{33}$ are corresponding to the same caption pixel and whether the pixel positions $P_{24}$ and $P_{15}$ are corresponding to the same caption pixel. This is because a situation that the caption pixel corresponding to the pixel position $P_{51}$ moves up for a double separated distance between the scan lines from the pixel position $P_{51}$ during the playing time of the image field $F_2$, and moves up for a single separated distance between the scan lines to the position to be interpolated P' during the playing time of the image field $F_3$ may occur. This situation also belongs to a situation that the vertically moving caption averagely moves for a distance one and half of the separated distance between the scan lines within a playing time of a single image field. For example, as shown in FIG. 2(e), the motion detector 115 respectively calculates the pixel differences between the pixel positions $P_{42}$ and $P_{33}$ and the pixel positions $P_{24}$ and $P_{15}$ and respectively compares the two pixel differences with the predetermined threshold value.

If both the two pixel differences are smaller than the predetermined threshold value, which represents that the caption pixels to which the three pixel positions correspond are the same pixel and have the same motion speed. At this time, if the caption pixel to which the pixel position $P_{51}$ corresponds is interpolated into the position to be interpolated P', it is more accurate to perform the motion compensation operation. Hence, the motion detector 115 will generate a flag value $f_4$ corresponding to the current calculated motion speed.

Please note that, the abovementioned practical method for estimating the motion speeds of the plurality of image objects is merely one of the manners that the motion estimation module 105 estimates the motion speed of the image object. Through the teaching in the present invention, the skilled in the art can perform appropriate modifications on the practical method for estimating the motion speed of the image object. For example, detecting whether one or a plurality of image objects in the vertically moving caption move for a distance four times of the separated distance between the scan lines within a double playing time of the image field, or switching the sequence for estimating the motion speeds of the image objects. Or the motion detector 115 refers to two pixel positions in the image fields $F_1$-$F_5$ to determine whether the two pixel positions are corresponding to the same image object for estimating the motion speed of the image object, and the motion detector 115 will calculate the individual pixel differences to which the two pixel positions correspond and compare the sum of the individual pixel differences with the predetermined threshold value. Hence, any design modifications performed on the abovementioned method for estimating the motion speed of image objects by the person skilled in the art, which should also fall into the scope of the present invention.

Moreover, because the target image frame to be played may only include one odd image field or one even image field (for example, the target image frame only has the odd image field $F_3$ in this embodiment), the caption pixels to which a plurality of positions to be interpolated in the image frame should be determined in advance to perform the motion compensation operation before playing the target image frame. The motion detector 115 will focus on each position to be interpolated to perform the abovementioned operation to output the plurality of flag values. The statistic unit 120 will compile statistics on the plurality of flag values to generate a plurality of statistical values and select the flag value to which a maximum value among the plurality of statistical values ($f_1$, $f_2$, $f_3$, and $f_4$) corresponds as the parameter. Concretely speaking, the statistic unit 120 will respectively compile statistics on the amount of the corresponding flag values to generate the plurality of statistical values according to different motion speeds calculated before. That is to say, different flag values represent different motion speeds, and the statistical values respectively represent the amount of the flag values to which different motion speeds correspond. As for the abovementioned example, the statistic unit 120 will generate four statistical values. And then the statistic unit 120 will determine the parameter according to a flag value to which a maximum value among the plurality of statistical values (such as four) corresponds. Detailed speaking, the statistic unit 120 will check whether the maximum value exceeds a predetermined threshold value (the reason is that the vertically moving captions have the same motion speed in practice, the generated maximum value usually exceeds the predetermined threshold value) first. If the maximum exceeds the predetermined threshold value (that is, the vertically moving captions move in a motion speed corresponding to the maximum value), the statistic unit 120 will determine the parameter according to the flag value to which the maximum corresponds. Hence, the determination module 125 determines the pixel that each position to be interpolated needed in the plurality of image fields according to the parameter, and the motion compensation module 110 interpolates the pixel determined by the determination module 125 into different positions to be interpolated in the target image frame. Due to the motion speeds of all the image objects (caption pixels) in the vertically moving caption being all the same, the determination module 125 usually determines the pixels that all the positions to be interpolated needed in the vertically moving caption according to the same parameter in the target image frame when determining the pixels that all the positions to be interpolated needed in the target image frame. The advantage is that an error caused from determining the pixels that some positions to be interpolated of the caption edge needed can be avoided by utilizing the statistics characteristic of the vertically moving caption.

Figure 4:
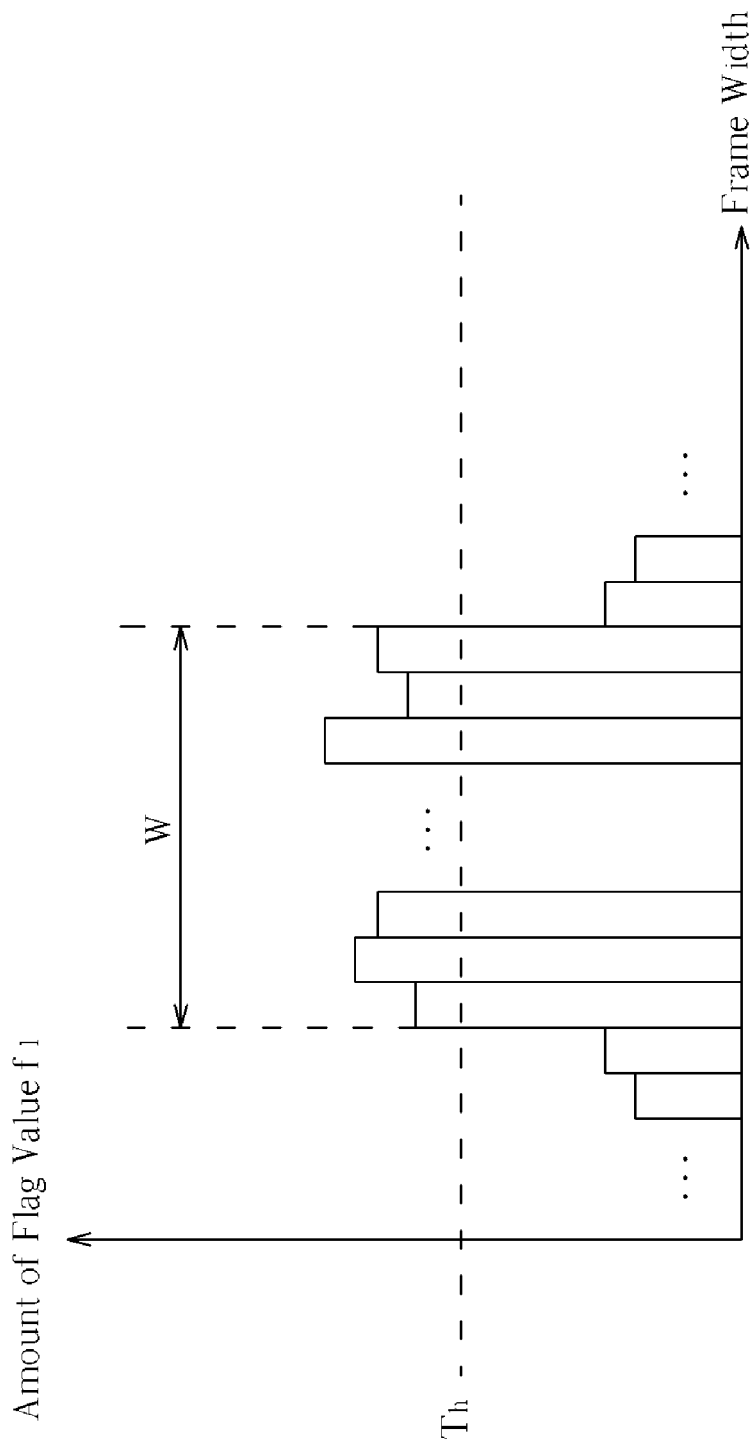
FIG. 4 is a distribution diagram of an amount of the flag values on the frame width to which a maximum value among the four statistical values compiled by the statistic unit in FIG. 1 corresponds.

Furthermore, the control unit 130 of the motion estimation module 105 can adjust a predetermined range for performing interpolation according to a distribution of the plurality of statistical values. Thus, the motion compensation module 110 is merely aimed at the positions to be interpolated within the predetermined range of the target image frame for performing interpolation. Please refer to FIG. 3. FIG. 3 is a simplified diagram of a predetermined range of the vertically moving captions in a TV frame. As shown in FIG. 3, the TV frame 300 includes two predetermined range 305 and 310 (oblique sections) of the vertically moving caption. Although the TV frame had already defined the predetermined range 305 and 310 in advance, however, due to not all the practical caption ranges of the vertically moving captions displayed on the channels being the same (that is the practical caption range of the vertically moving caption may be smaller than the predetermined range), a motion compensation operation error for interpolating the caption pixel the pixel position beyond the caption range when performing pixel interpolation can be avoided by utilizing the control unit 130. Please refer to FIG. 4. FIG. 4 is a distribution diagram of an amount of the flag values on the frame width to which a maximum value among the four statistical values corresponds. For example, assume that the motion detector 115 detects that a distance between two pixel position to which most image objects correspond is four times of the separated distance between the scan lines (that is the flag value to which the maximum value corresponds is $f_1$). Due to the amount of the flag value $f_1$ in FIG. 4 only exceeding a threshold value Th within the caption width W and being lower than the threshold value Th beyond the caption width W, the practical caption width may be W. The control unit 130 will adjust the predetermined range 305 or 310 to the caption width W. The motion compensation module 110 will interpolate the pixels determined by the determination module 125 into the positions to be interpolated within the adjusted predetermined range according to the parameter, thus the display quality of the vertically moving caption can be improved when watching TV. Of course, in order to prevent from exceeding calculations when adjusting the predetermined range, the positions to be interpolated within the predetermined range can be directly used for performing the motion compensation operation and the control unit 130 is omitted. That is, the control unit 130 in the embodiments of the present invention is an optional element.

In addition, in other embodiments, the motion estimation module can estimate the motion speed of a single image object of the vertically moving caption in the target image frame to output a parameter according to the abovementioned image fields, and the determination module can directly determine a pixel according to the parameter. Hence, the motion estimation module merely needs a motion detector (or merely needs the motion detector and a control unit) without the abovementioned statistic unit, which should also conform to the spirit of the present invention. In this embodiment, the motion detector is used for detecting the pixels located in different image fields to estimate the motion speed of an image object to determine the parameter.

Those skilled in the art will readily observe that numerous modifications and alterations of the device and method may be made while retaining the teachings of the invention.

What is claimed is:

1. An interpolation method applied to image pictures when performing de-interlacing operations, for interpolating at least one pixel into a position to be interpolated in a target image frame, the interpolation method comprising:
    receiving a plurality of image fields having a corresponding image object;
    estimating a motion speed of the image object by computing an average motion speed according to a distance between a first pixel position to which the image object located in a first image field of the plurality of image fields corresponds and a second pixel position to which the image object located in a second image field of the plurality of image fields corresponds, wherein the first pixel position is located on a different scan line than a scan line of the second pixel position;
    determining a pixel from the plurality of image fields according to the estimated motion speed of the image object; and
    interpolating, using the estimated motion speed, the pixel into the position to be interpolated in the target image frame.

2. The interpolation method of claim 1, wherein the step of estimating the motion speed of the image object further comprises:
    estimating the motion speed of the image object in a vertical direction of the plurality of image fields.

3. The interpolation method of claim 1, wherein the motion speed is represented by a corresponding parameter, the interpolation method further comprising:
    compiling statistics on an amount of the parameter to generate a plurality of statistical values; and
    determining the pixel according to the parameter to which a maximum value among the plurality of statistical values corresponds.

4. The interpolation method of claim 3 further comprising:
    determining the pixel when the maximum value exceeds a threshold value.

5. The interpolation method of claim 1, wherein the motion speed is represented by a corresponding parameter and the image object is located within a predetermined range of the target image frame, the interpolation method further comprising:
    compiling statistics on an amount of the parameter to generate a plurality of statistical values; and
    adjusting the predetermined range according to a distribution of the plurality of statistical values.

6. The interpolation method of claim 1, wherein the image object is a caption pixel in the plurality of image fields.

7. The interpolation method of claim 1, wherein the interpolation method is applied to a NTSC TV frame.

8. An image processing apparatus for interpolating, when performing de-interlacing operations, at least one pixel into a position to be interpolated in a target image frame, the image processing apparatus comprising:
    a motion estimation module, used for estimating a motion speed of an image object according to a first pixel position to which the image object located in a first image field of a plurality of image fields corresponds and a second pixel position to which the image object located in a second image field of the plurality of image fields corresponds and for outputting a corresponding parameter according to the motion speed, wherein the first pixel position is located on a different scan line than a scan line of the second pixel position;

a determination module, coupled to the motion estimation module, for determining a pixel from the plurality of image fields according to the parameter; and a motion compensation module, coupled to the determination module, for interpolating, using the estimated motion speed, the pixel determined by the determination module into the position to be interpolated in the target image frame.

9. The image processing apparatus of claim 8, wherein the motion estimation module is used for estimating the motion speed of the image object in a vertical direction of the plurality of image fields.

10. The image processing apparatus of claim 8, wherein the motion estimation module estimates the motion speed of the image object according to a distance between the first pixel position to which the image object located in the first image field corresponds and the second pixel position to which the image object located in the second image field corresponds.

11. The image processing apparatus of claim 8, wherein the image object is a caption pixel in the plurality of image fields.

12. The image processing apparatus of claim 8, wherein the motion estimation module respectively estimates a plurality of motion speeds of a plurality of image objects to determine the parameter.

13. The image processing apparatus of claim 8, wherein the motion estimation module comprises:

a motion detector, used for detecting a plurality of image objects in the plurality of image fields and for estimating a plurality of motion speeds of the plurality of image objects to generate a plurality of flag values; and a statistic unit, coupled to the motion detector, for compiling statistics on the plurality of flag values to generate a plurality of statistical values and for selecting the flag value to which a maximum value among the plurality of statistical values corresponds as the parameter.

14. The image processing apparatus of claim 13, wherein the motion detector detects the plurality of motion speeds of the plurality of image objects located within a predetermined range of the plurality of image fields, and the motion estimation module further comprises:

a control unit, coupled to the statistic unit, for adjusting the predetermined range according to a distribution of the plurality of statistical values.

15. An interpolation method applied to image pictures when performing de-interlacing operations, the method comprising:

receiving a plurality of image fields having a vertically moving image object;

estimating a motion speed of the image object in a vertical direction according to a pixel distance and a distance between scan lines, wherein the pixel distance is calculated according to a first pixel position and a second pixel position, wherein the first pixel position is located in a different image field and a different scan line than an image field and scan line of the second pixel position;

determining a pixel from the plurality of image fields according to the estimated motion speed of the image object; and interpolating, using the estimated motion speed, the pixel into a position to be interpolated in the target image frame.

16. The interpolation method of claim 15, further comprising:

compiling statistics relating to a parameter corresponding to the motion speed to generate a plurality of statistical values; and determining the pixel according to the parameter with a maximum statistical value among the plurality of statistical values.

17. The interpolation method of claim 16, further comprising:

determining the pixel based on the maximum statistical value and a threshold value.

* * * * *